Oct. 16, 1934. F. E. WOLCOTT 1,977,365
COFFEE MAKER
Filed Jan. 6, 1932
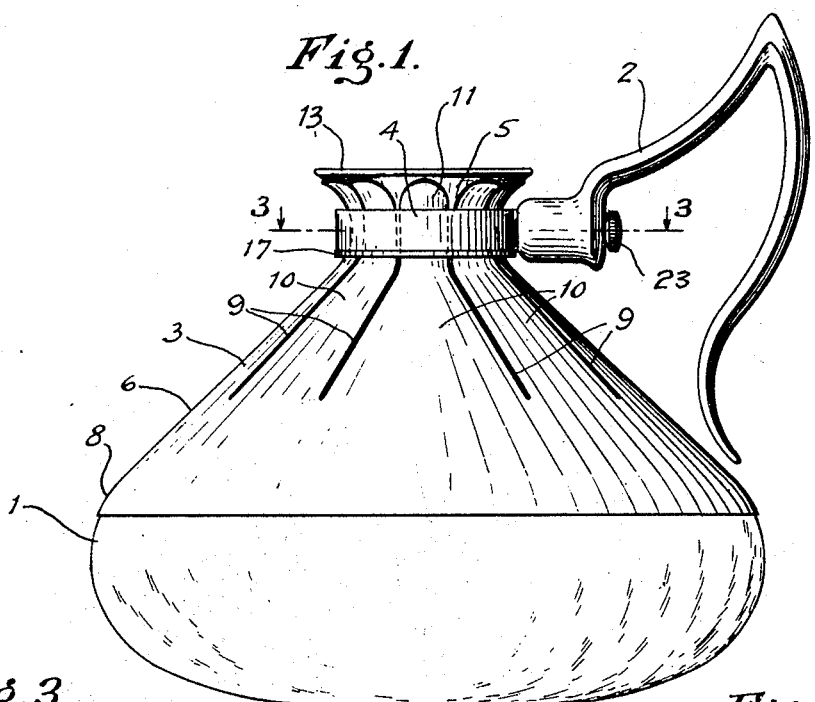
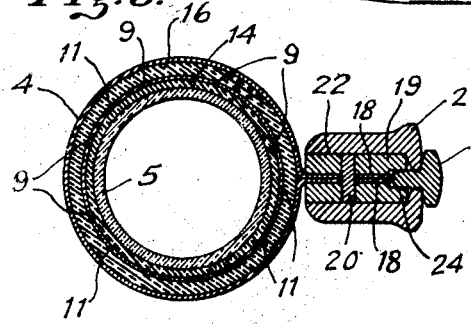
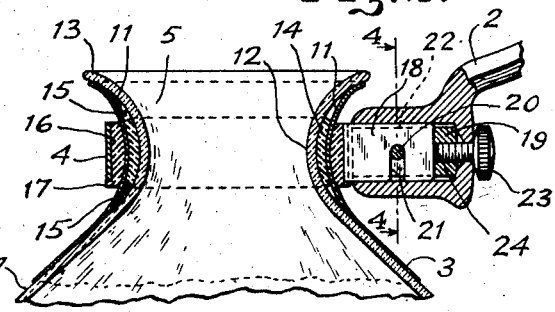
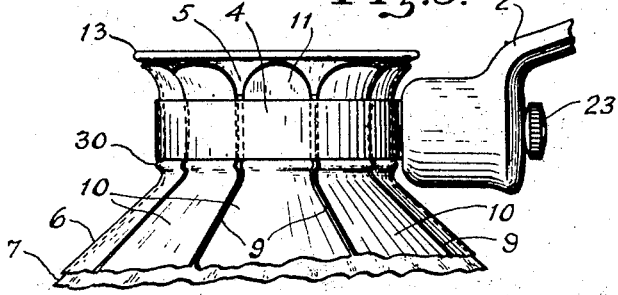
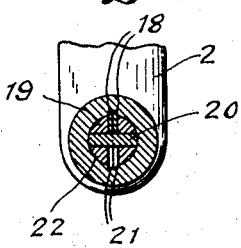
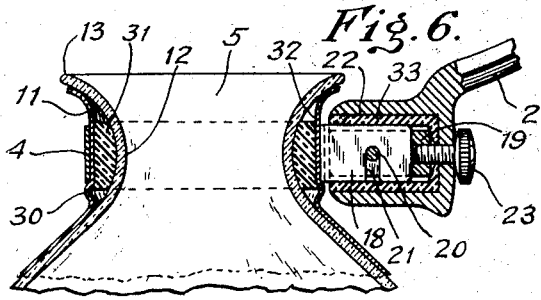
INVENTOR
FRANK E. WOLCOTT
BY
ATTORNEY.

Patented Oct. 16, 1934

1,977,365

UNITED STATES PATENT OFFICE 1,977,365

COFFEE MAKER

Frank E. Wolcott, West Hartford, Conn., assignor to The Silex Company, a corporation of Connecticut Application January 6, 1932, Serial No. 585,047

25 Claims. (Cl. 53—3)

My invention relates to coffee makers.

It has among its objects to provide an improved lower bowl assembly for coffee makers, and, more particularly, one wherein, while still enabling the use of glass as a container for the coffee and of a convenient form of handle, it is made possible to provide the bowl with a shield adapted to protect the bowl against breakage, and to make possible new and improved decorative effects. A further object of my invention is to provide an improved construction of this type wherein the handle acts to hold the shield in position while also being effectually insulated from both the glass bowl and the shield in such manner as to avoid objectionable heating of the handle. A still further object of my invention is to provide an improved shield construction adapted to be disposed upon the lower bowl of a coffee maker and to be readily attached to or removed therefrom while also being adapted to be held in position by the handle and insulated in an effective manner from the grasping portion of the latter. These and other objects and advantages of my improved construction will, however, hereinafter more fully appear.

In the accompanying drawing, I have shown for purposes of illustration two embodiments which my invention may assume in practice.

In the drawing,—

Figure 1 is a side elevation of one form of my invention applied to the lower bowl of a coffee maker;

Fig. 2 is a vertical sectional view of the upper portion of the bowl with my improved shield and handle connection thereon;

Fig. 3 is a sectional view on line 3—3 of Figure 1;

Fig. 4 is a sectional view on line 4—4 of Figure 2;

Fig. 5 is a side elevation of a portion similar to that shown in Figure 2, but showing a modified construction, and Fig. 6 is a vertical sectional view corresponding to Figure 2, but showing the construction shown in Figure 5.

In the construction illustrated in Figures 1 to 4, it will be noted that I have shown a lower bowl 1 of a well known type and provided with a handle 2 enabling the bowl to be used as the serving or pouring bowl, this bowl herein also having an improved shield 3 covering the upper portion of the bowl and held in position in an improved manner by the handle band 4 which is disposed around the neck 5 of the bowl, all as hereinafter described.

Referring more particularly to the shield 3, it will be noted that the same comprises a body portion 6 which herein is adapted to be received on the sloping upper portion 7 of the bowl 1 leading toward the neck 5. Obviously, this body 6 may be of different lengths, depending upon the amount of surface of the bowl 1 which it is desired to protect. Herein, however, it will be noted that the same extends down to a point adjacent and slightly above the point of maximum width of the bowl. It will also be noted that the same is herein provided with a slightly inturned lower edge 8 adapted to conform substantially to the curvature of the lower portion of the bowl, while the body portion 6 thereafter extends upward and conforms substantially to the shape of the bowl. Herein this body portion 6 is also provided with a plurality of slots 9 which, while spaced from the lower extremity of the body 6, extend up to the top of the same. As shown, these slots are farther apart at their bottom than at their top, and each adjacent pair also co-operates to provide an upwardly projecting tongue 10 having an upwardly projecting end portion 11 disposed around the constricted portion 12 of the neck 5. Thus it will be noted that a construction is provided in which, when the member 3 is formed of metal, sufficient spring is provided in the tongues 10 between adjacent slots 9 to permit the shield 3 to be readily slipped over the usual flange 13 on the upper end of the neck 5 above the constricted portion 12, and one wherein, after the member 3 has thus been forced down on to the top of the bowl, the portions 10 and 11 will spring together in such manner as to conform substantially to the shape of the upper end of the bowl.

Referring more particularly to the handle connection and the means for insulating the handle 2, it will be noted that herein I provide a suitable insulating washer 14 around the outside of the constricted portion 12 of the bowl neck and between the neck and the portions 11 in such manner as to keep these members 11 out of contact with the constricted portion of the bowl. Herein, as preferably, the insulating washer 14 is in the form of a soft rubber band adapted to grasp the bowl neck snugly and to be engaged on its outer face by the portions 11. Also, it will be noted that herein the portions 11 are preferably bent back slightly relative to the portions 10 and disposed on a slightly different arc from the arc of the constricted portion 12 of the neck in such manner that they do not touch the glass of the bowl at points 15 immediately above and below the washer 14, although engaging the underside of the flange 13 and the portion 7 of the bowl at points farther above and below the washer. As shown herein, the upper ends of the portions 11 preferably do not project beyond the edge of the flange 13. Disposed around the members 11 is also an outside insulating member 16, herein of substantially the same width as the member 14, which provides a means of holding the members 11 against the member 14 while also insulating the members 11. In a preferred construction, this member 16 is preferably also of soft rubber, and like the member 14, in the form of a relatively thin band adapted to be readily applied or removed, as desired. Herein it will also be noted that the member 16 is provided with a flange 17 on its lower edge, while the band 4 of the handle 2 extends around the same above this flange in such manner as firmly to grip the member 16 when the spring band 4 is connected to the handle in the usual manner. While various other forms of connections for the band 4 may be used, herein it will be noted that the same are of the type described and claimed in my co-pending application Serial No. 600,930, filed March 24, 1932, and comprise slotted extensions 18 on the band adapted to be received in a slotted member 19 which in turn carries a pin 20 receivable in slots 21 in the extensions 18, while the extensions 18 and the member 19 are both adapted to be received in a suitable chamber 22 in the handle member 2 and to be held in position therein by a threaded member 23 threaded at 24 into one end of the member 19.

In assembling the structure, with the member 14 on the bowl neck, it will be noted that the member 6 may be readily positioned on the bowl by simply forcing it down over the neck to spring the members 11 out, and that these members 11, after passing the flange 13, will spring back and engage the member 14. Thereafter, the member 16 is disposed outside the members 11, and then the band 4 and the handle 2 may be readily connected in a usual manner. When so connected, it will be noted that the construction forms a unit, and one in which the handle 2 is effectually insulated from the bowl, in such manner as to be always cool enough to handle. More particularly, the member 14 serves to insulate the members 11 from the bowl neck, while the member 16 serves to insulate the band 4 from the members 11, all in such manner that the heat transmitted to the band 4 and through the latter to the handle 2 is minimized. At the same time it will also be evident that whenever it is desired to remove the handle, this can be readily accomplished by removing the member 23, withdrawing the handle 2 bodily, and removing the slotted member 19 to release the extensions 18 and permit removal of the member 16, which releases the members 11 and permits readily lifting off of the member 6.

In Figures 5 and 6, I have illustrated a modified construction which may be used under certain conditions. In this construction, it will be understood that the member 6 is provided with portions 10 and 11 substantially as heretofore described, save that the portions 11 are bent back further adjacent the neck, as shown in Figure 6, and are provided with a bead 30 near the bottoms of the same, which is adapted to form a supporting abutment for the band 4 of the handle. In this construction a member 31, thicker than the member 14, is disposed around the outside of the neck of the bowl, and this member 31 is also provided with a cylindrical outside surface, against which the inside surfaces of the new, relatively straight portions 32 on the extensions 11 engage. Moreover, it will be noted that an insulating bushing 33 is also provided inside the chamber 22 in the handle which is adapted to receive the member 19 and is also suitably apertured to permit the passage of the member 23, all in such manner as to form an effective insulating means for the member 19. Obviously, in this construction, at the same time that a unitary construction is provided, as heretofore described, it is also possible to minimize conduction of heat to the handle 2, the members 31 and 33 each co-operating to reduce the heat transmitted to the handle in an effective manner. This construction is also connectable to and removable from the bowl in a manner generally similar to that previously described, although it will be noted that due to the elimination of the outside member 16, the steps incident to putting this member in position during assembly and removing the same when removing the handle, are also eliminated.

As a result of my improvements, a construction is provided wherein, while still retaining the advantages of a glass container for the coffee, it is made possible to produce a container which is, in effect, a metal container, in so far as protection against breakage is concerned, the shield covering substantially the whole top of the bowl in such manner as to minimize breakage. Further, by providing a metal shield 6, as for example one having silver, chromium, or other plating thereon, it is made possible to produce a very decorative effect, while it will be evident that the shield may carry decorations of various forms. Attention is also directed to the fact that the shield may be readily applied with small expense to existing devices, whenever desired, while the form shown in Figure 4 requires no change whatever in the handle connection.

While I have in this application specifically described two embodiments which my invention may assume in practice, it will be understood that these forms of the same are shown for purposes of illustration, and that the same may be modified and embodied in other forms without departing from the spirit of the invention or the scope of the appended claims.

What I claim as new and desire to secure by Letters Patent is:—

1. In a coffee maker, a bowl having a neck portion and a body portion, a shield for the latter portion, and handle means on said neck portion positioning said shield.

2. In a coffee maker, a bowl having a neck portion and a body portion, a bowl shield conforming to said latter portion, a handle, and means on said neck portion grasped by said handle and positioning said shield.

3. In a coffee maker, a bowl having a neck and a body portion, a shield for said body portion receivable over said neck, and a handle on said neck insulated from said neck and said shield.

4. In a coffee maker, a bowl having a neck, a shield for said bowl receivable over said neck, a handle on said neck, and means on said neck insulating said handle from said shield and positioning the latter.

5. In a coffee maker, a bowl having a neck, a shield for said bowl receivable over said neck, a handle having means surrounding said neck, and insulating means between said means and said 6. In a coffee maker, a bowl having a neck, a shield for said bowl receivable over said neck, a handle having a band surrounding said neck, and insulating means for said handle and said shield engageable with said band and said shield and removable to permit removal of the latter.

7. In a coffee maker, a bowl having a neck, a shield for said bowl receivable over said neck, a handle having a band surrounding said neck, and insulating means for said handle and said shield engageable with said band and said shield comprising a plurality of insulating members.

8. In a coffee maker, a bowl having a neck, a shield for said bowl receivable over said neck, a handle having a band surrounding said neck, and insulating means for said handle and said shield engageable with said band and said shield comprising insulating members on said neck inside and outside said shield.

9. In a coffee maker, a bowl having a neck, a shield for said bowl receivable over said neck, a handle on said neck, means on said neck insulating said shield from said neck, and means on said handle insulating the same from said shield.

10. In a coffee maker, a bowl having a neck, a shield receivable over said neck, a handle having a portion extending around said neck, and means for insulating said handle from said portion.

11. In a coffee maker, a bowl having a neck, a shield receivable over said neck and having an expansible neck portion, a handle having a portion extending around said neck portion, and means for insulating said handle from said shield comprising an insulating member between said handle portion and said shield.

12. In a coffee maker, a bowl having a neck, a shield receivable over said neck and having an expansible neck portion, a handle having a portion extending around said neck portion, and means for insulating said handle from said shield comprising an insulating member between said handle portion and said shield and a co-operating insulating member between said neck portion and the bowl neck.

13. In a coffee maker, a bowl having a neck, a shield receivable over said neck, a handle having a portion extending around said neck, insulating means between said neck and said shield, and insulating means between the grasping portion of said handle and said shield.

14. In a coffee maker, a bowl having a neck, a shield receivable over said neck and having an expansible neck portion comprising a series of neck members, and a handle having a portion compressing said members and a grasping portion insulated from said neck members.

15. In a coffee maker, a bowl having a neck, and a handle having a portion grasping said neck, a removable grasping portion, and insulating means between the portions of said handle.

16. In a coffee maker, a bowl having a neck, an insulating member carried on said neck, a shield on said bowl having resilient neck portions engaging said insulating member and handle locating means on said neck portions, and a handle having a portion compressing said neck portions and engageable with said locating means.

17. In a coffee maker, a bowl having a neck, an insulating member carried on said neck, a shield on said bowl having resilient neck portions engaging said insulating member, and a handle having a portion compressing said neck portions and a grasping portion insulated from said compressing portion.

18. A shield for coffee maker bowls comprising a member having an opening in the top thereof and insertable over the neck of a bowl and armoring the top of the bowl while exposing the heating area on the latter, and means disposable around the neck of a bowl for positioning said shield and comprising a handle and co-operating separable elements separable to permit removal of said shield.

19. A shield for the lower bowl of a coffee maker comprising a body portion disposable on the top of a bowl and armoring the latter, and insulating means disposable around the neck of a bowl and adapted to be engaged by a handle while insulating the latter from said shield and means comprising a handle and co-operating separable elements separable to permit removal of said shield.

20. A shield for coffee maker bowls comprising a member having an opening in the top thereof and insertable over the neck of a bowl and armoring the top of the bowl while exposing the heating area on the latter, means disposable about the neck of a bowl and engageable with said shield to position the same relative to a bowl and also engageable by a bowl handle, and a handle having means engageable therewith and elements separable to permit removal of said first mentioned means and shield.

21. In a coffee maker, a bowl having a body portion and a neck portion, removable shield means on said bowl extending over a substantial part of the body portion thereof, and means disposable about said neck portion for positioning said shield means.

22. A shield for coffee maker bowls comprising a continuous annular member having an opening in the top thereof and insertable over the neck of a bowl, and armoring the top of the bowl while exposing the heating area on the latter, and also having a resilient neck portion adapted to grasp the neck of the bowl.

23. In combination, a coffee maker lower bowl having a neck portion and a body portion, insulating means surrounding said neck portion, independent enclosing means removably disposed around said insulating means, and handle carrying means encircling said enclosing means and removable independently thereof.

24. In combination, a coffee maker lower bowl having a neck portion and a body portion, insulating means surrounding said neck portion, independent enclosing means removably disposed around said insulating means and having depending means overlying the body portion of the bowl, and handle carrying means encircling said enclosing means and removable independently thereof.

25. In a coffee maker, a bowl having a body portion and a neck portion, a shield disposable over said body portion, and handle mounting means having a portion disposed around said neck and positioning said shield.

FRANK E. WOLCOTT.